April 14, 1970     G. L. WILDE     3,505,816
GAS TURBINE POWER PLANT

Filed March 25, 1968     4 Sheets-Sheet 1

INVENTOR
GEOFFREY LIGHT WILDE
By
Cushman, Darby & Cushman
ATTORNEYS

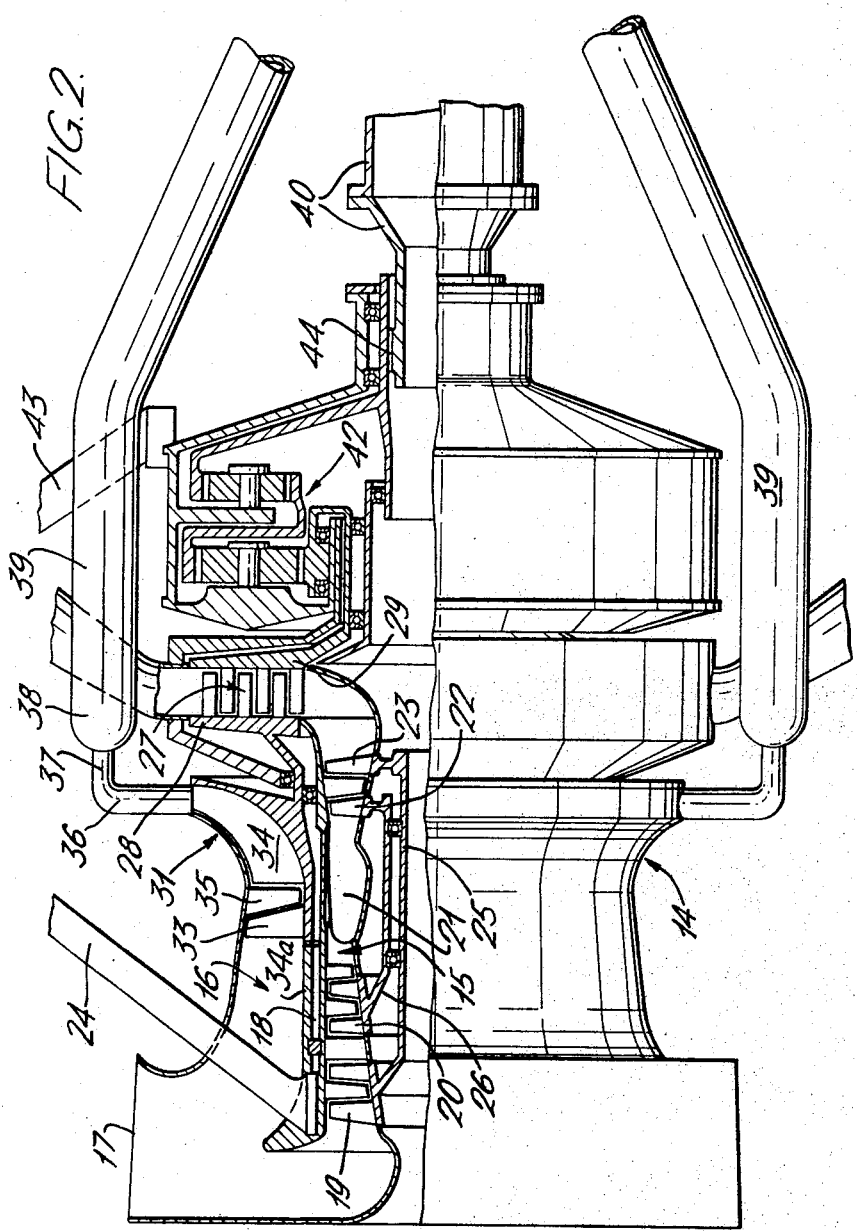

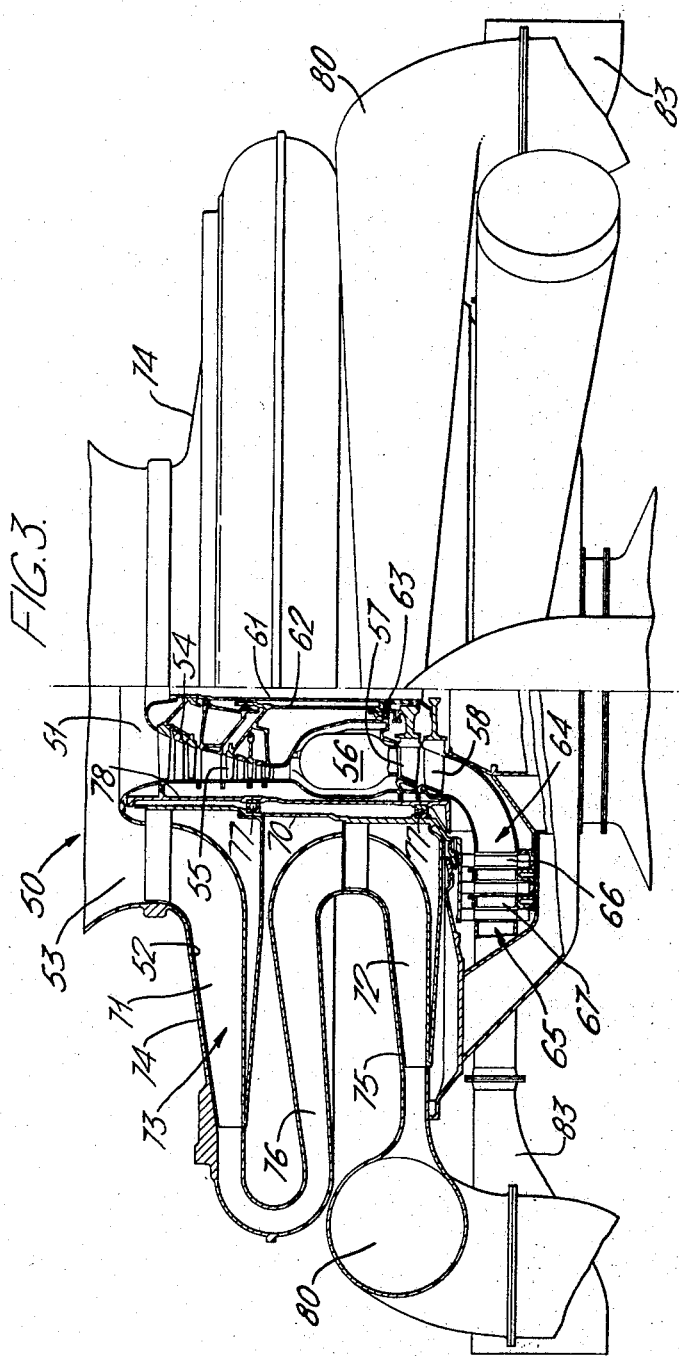

April 14, 1970 G. L. WILDE 3,505,816
GAS TURBINE POWER PLANT
Filed March 25, 1968 4 Sheets-Sheet 4
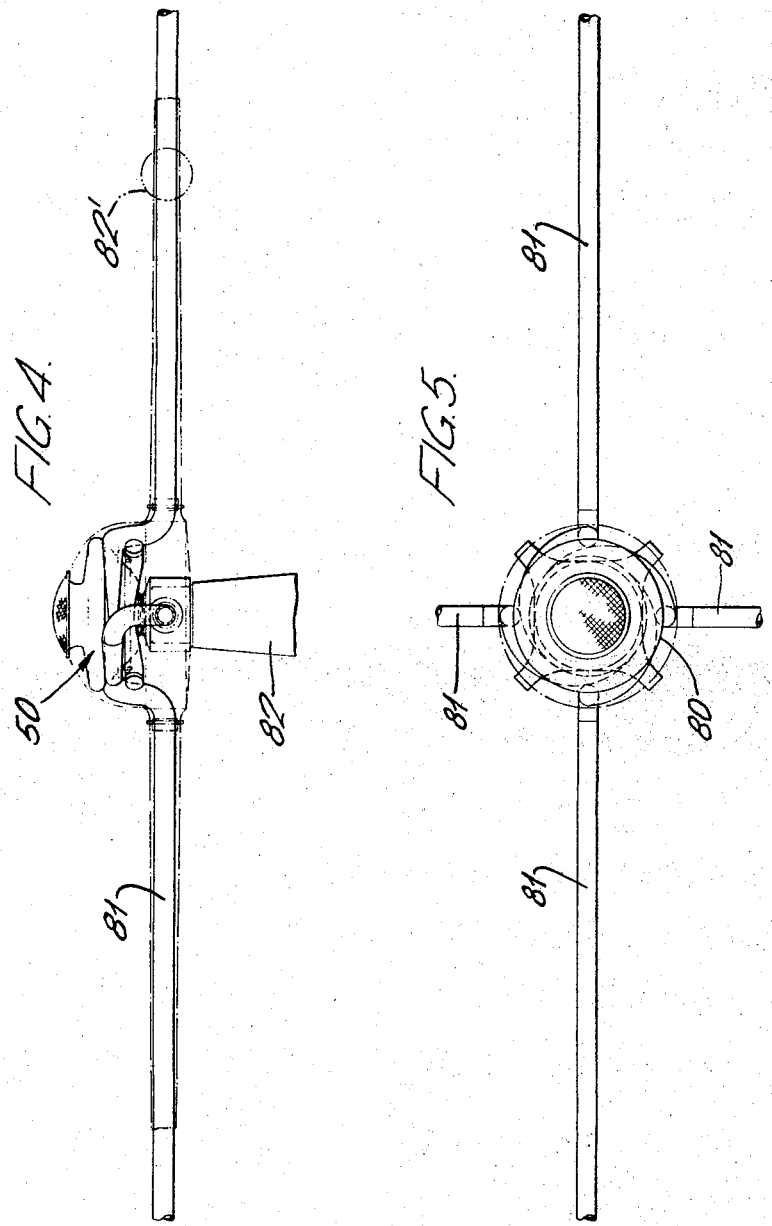
INVENTOR
GEOFFREY LIGHT WILDE
BY
Cushman, Darby & Cushman
ATTORNEYS

United States Patent Office 3,505,816
Patented Apr. 14, 1970

3,505,816
GAS TURBINE POWER PLANT
Geoffrey Light Wilde, Derby, England, assignor to Rolls-Royce Limited, Derby, England, a British company
Filed Mar. 25, 1968, Ser. No. 715,803
Claims priority, application Great Britain, Apr. 12, 1967, 16,872/67; June 15, 1967, 27,752/67
Int. Cl. F02c 3/10, 7/02
U.S. Cl. 60—226        13 Claims

ABSTRACT OF THE DISCLOSURE

A gas turbine power plant, especially for a helicopter, includes a main flow duct in which is located a gas turbine gas generator and a multi-stage free turbine driven by exhaust gases from the generator. At least one stage of the turbine is radial flow. There is a fan duct which is radially outwardly of, and coaxially with, the main flow duct in which the gas turbine generator is located, and the fan duct contains a fan having at least one centrifugal flow rotor stage drivingly connected to the radial flow stage of the free turbine. The fan exhaust may be directed into hollow apertured rotary wings, of a rotary wing aircraft, or one stage of the turbine may be drivingly connected to a member which is external to the power plant such as to the hub rotor of a rotary wing aircraft.

---

Figure 1:
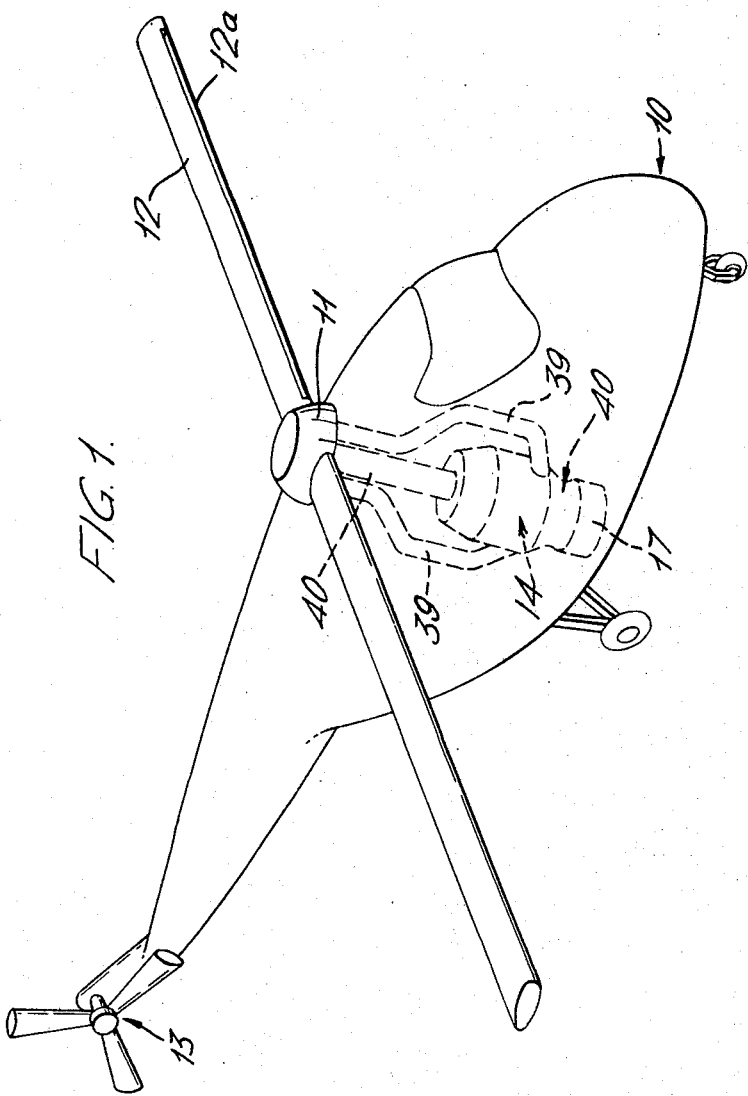

This invention concerns gas turbine power plant, and rotary wing aircraft, e.g. helicopters, provided with such gas turbine power plant.

According to one aspect of the present invention there is provided a gas turbine power plant comprising a main flow duct in which is located a gas turbine gas generator, a multi-stage turbine means adapted to be driven by exhaust gases from said gas generator and having at least one radial flow rotor stage, and a fan duct which is radially outwardly of, and coaxial with, said main flow duct and in which is located a fan, said fan having at least one centrifugal flow rotor stage drivingly connected to said at least one radial flow rotor stage. The rotor stage of the turbine means which is not a radial flow rotor stage may be drivingly connected to a member which is disposed externally of the power plant. Alternatively, duct means may be provided for directing fan exhaust into hollow apertured rotary wings of a rotary wing aircraft.

Preferably, said turbine means has at least two rotor stages, at least one of which is drivingly connected to said fan, and at least one other of which is drivingly connected to a member which is disposed externally of the power plant. The said member may in this case be a rotor of a rotary wing aircraft.

The rotor stages are preferably alternately mounted from opposite sides of the main flow duct, and the alternate rotor stages of the turbine means may be arranged to contra-rotate in operation. The turbine means may in this case be statorless.

The fan preferably includes an axial flow rotor stage upstream of the or a centrifugal flow rotor stage.

The fan may have two said centrifugal flow rotor stages, the fan duct having a portion which extends radially inwardly from the first to the second of the centrifugal flow rotor stages.

The gas turbine gas generator and the fan may have a common air intake. Preferably the gas generator is mounted in a housing, there being bearing means mounted on said housing, and the fan is journalled in said bearing means.

According to another aspect of the invention there is provided a rotary wing aircraft provided with at least one gas turbine power plant as set forth above.

The rotary wing aircraft is preferably a helicopter, although it may be a fixed wing aircraft having in addition one or more rotary wings.

Preferably, in operation, the fan exhaust air is ducted to a rotor of the helicopter for boundary layer control of the said rotor, and/or for providing air jets for rotating rotor blades of the rotor, and/or for supplying combustion air to engines mounted in said rotor blades for rotating the latter.

Drive to said rotor may be provided from said at least one other turbine rotor via an epicyclic gearbox.

The gearbox is preferably located downstream of the gas generator and its output shaft is substantially coaxial with the axis of the gas generator.

The said rotor blades may be cylindrical and may be provided with slots.

The invention is illustrated, merely by way of example, in the accompanying drawings, in which:

FIGURE 1 is a diagrammatic perspective view of a helicopter showing, purely schematically, a gas turbine power plant according to the present invention, FIGURE 2 is a part-elevation, part longitudinal section of the power plant of FIGURE 1, shown at 90° to its position in that figure, FIGURE 3 is a sectional elevation of a gas turbine power plant according to the present invention, and FIGURES 4 and 5 are respectively an elevation and a plan of the rotor mast of a helicopter which is provided with the power plant of FIGURE 3.

Referring to FIGURE 1, there is shown a helicopter 10 of substantially conventional body construction having a rotor mast 11 to which are secured cylindrical rotor blades 12. At the rear of the helicopter 10 a tail rotor 13 is provided. The rotor blades 12 are adapted to be rotated by a gas turbine power plant 14, and are hollow and slotted 12a so that air may be ducted to them for boundary layer control purposes and/or for driving them by jet reaction.

The gas turbine power plant 14 is illustrated in FIGURE 2. It is seen to comprise a main flow duct 15 and a fan duct 16, the latter being radially outwardly of, and coaxial with, the former. The main flow duct 15 and the fan duct 16 have a common annular air intake 17. The two ducts are separated by a casing 18 supported from fixed structure (not shown) by struts 24.

Located in the main flow duct 15 there is a gas turbine gas generator which comprises, in axial flow series, a low pressure compressor 19, a high pressure compressor 20, combustion equipment 21, a high pressure turbine 22 and a low pressure turbine 23. The low pressure compressor and turbine 19, 23 are drivingly connected by a shaft 25, while the high pressure compressor and turbine 20, 22 are drivingly connected by a shaft 26, the shaft 26 being concentric with and radially outwardly of, the shaft 25, bearings being provided therebetween.

The gas generator operates in the well-known manner which therefore will not be described in detail.

Downstream of the turbines 22, 23 the main flow duct 15 has a radially outwardly turned section 27. Mounted in this section 27 are two radial flow multistage turbines 28, 29 which are adapted to be driven by exhaust gases from the axial flow part of the main flow duct 15. The turbines 28, 29 are secured to opposite axial sides of the section 27, and are arranged to contra-rotate in operation, the rotor stages of the turbines 28, 29 alternating with each other with no stator stages between consecutive rotor stages.

It will be appreciated that in this way two separate drives are produced. The turbine 28 is arranged to drive a fan 31 in the fan duct 16, the shaft of the turbine 28 being integral with or rigidly connected to the shaft on which the fan 31 is mounted.

The fan 31 comprises an axial flow rotor stage 33 and a centrifugal flow rotor stage 34 with a stator stage 35, therebetween. The fan duct 16 has a radially outwardly turned section 36 followed by a section 37 at substantially 90° to section 36, i.e. substantially axial. The fan 31 is rotatable on 2 bearings 32 mounted on a housing 34a of the power plant 14.

The section 37 of the fan duct 16 connects to an annular manifold 38, which in turn is connected to two or more ducts 39 which pass alongside the power plant 14, into and through the rotor mast 11 to the interior of the hollow rotor blades 12. In operation, air compressed by the fan 31 is ducted to the blades 12 for the purposes of boundary layer control. Additionally, or alternatively, the fan air may be used for propelling the blades 12 by jet reaction if the blades 12 are provided with appropriate nozzles.

The exhaust from the main duct 15 is arranged to pass to atmosphere. The turbine 29 is mounted on a shaft which is drivingly connected to a rotor blade drive shaft 40. In order, however, that the turbine 29 may drive shaft 40, at a much lower speed, an epicyclic gearbox 42 is interposed therebetween. As can be seen, the gearbox 42 is located downstream of the radial flow section 27 of the main flow duct 15. One or more struts 43 are provided for supporting the gearbox 42 from fixed structure (not shown). The output shaft 44 of the gearbox 42 is parallel with the longitudinal axis of the power plant 14 and is splined to the rotor blade drive shaft 40.

In a further embodiment of the invention (not shown), the epicyclic gearbox 42 of FIGURE 2 is omitted, together with shafts 44 and 40. In this case 29 represents stationary stator blades of the turbine 28. It will be appreciated that in this embodiment the power plant 14 does not provide a mechanical drive to the rotor blades 12 and these are rotated by independent means (not shown). Thus here the power plant 14 merely provides air for boundary layer control and reduction of cruising drag, although the exhaust gases from turbine 28 may, if desired, be utilised for assisting forward propulsion or attitude control.

In FIGURE 3 there is shown a gas turbine power plant 50 which comprises a main flow duct 51 and a fan duct 52, the fan duct 52 being disposed radially outwardly of and co-axial with the main flow duct 51. The main flow duct 51 and the fan duct 52 have a common air intake 53.

Located in the main flow duct 51 is a gas turbine gas generator which comprises, in axial flow series, a two stage low pressure compressor 54, a three stage high pressure compressor 55, combustion equipment 56, a single stage high pressure turbine 57, and a single stage low pressure turbine 58. The low pressure compressor 54 and the low pressure turbine 58 are drivingly connected by a shaft 61. The high pressure compressor 55 and the high pressure turbine 57 are drivingly connected by a shaft 62 which is concentric with and disposed radially outwardly of the shaft 61, a bearing 63 being located therebetween.

Downstream of the turbines 57, 58 the main flow duct 51, has a radially outwardly turned section 64. Mounted in the section 64 is a three-stage radial flow turbine 65. The radial flow turbine 65 has rotor blades 66, which are adapted to be driven by exhaust gases which have passed through the turbines 57, 58, and stator blades 67 which are secured to fixed structure.

The rotor blades 66 of the radial flow turbine 65 are mounted on a shaft 70 which drives first and second centrifugal flow rotor stages 71, 72 of a fan 73 which is mounted in the fan duct 52. The centrifugal flow rotor stages 71, 72 direct the air flowing through the fan duct 52 through radially outwardly extending portions 74, 75 respectively of the fan duct 52, the fan duct 52 having a portion 76 which extends radially inwardly from the first centrifugal flow rotor stage 71 to the second centrifugal flow rotor stage 72. The shaft 70 is rotatable on two bearings 77 which are mounted on a housing 78 of the gas generator.

The portion 75 of the fan duct 52 ducts the fan exhaust air to an annular manifold 80. The fan exhaust air from the manifold 80 is, as best seen in FIGURE 4 and FIGURE 5, ducted to the interiors of four cylindrical rotor blades 81 carried by a rotor mast 82.

The fan exhaust air so supplied to the interiors of the rotor blades 81 may pass out through slots (not shown) therein for boundary layer control. Additionally, or alternatively, the rotor blades 81 may be provided with nozzles (not shown) through which the fan exhaust air may be ducted so as to rotate the rotor blades 81 by jet reaction. Yet another possibility is for the fan exhaust air supplied to the interiors of the rotor blades 81 to provide combustion air for small jet engines, indicated diagrammatically at 82'; for driving the rotor blades 81 by jet reaction. These engines 82' may either be located at the tips of the rotor blades 81 or radially inwardly thereof, as shown.

The turbine exhaust gases which have passed through the radial flow turbine 65 are ducted to a volute 83 from which they are downwardly directed to atmosphere so as to provide some lift. Additionally, or alternatively, the turbine exhaust gases may be utilised for assisting forward propulsion or attitude control.

It will be appreciated that the present invention provides a power plant for rotary wing aircraft of relatively short axial length which renders it suitable for mounting vertically in the aircraft. It may e.g. be installed in the restricted space between the passenger compartment and the external casing of the rotary wing aircraft.

I claim:

1. A gas turbine power plant comprising a main flow duct, a gas turbine gas generator and a turbine means located in flow series in the said main flow duct, the said turbine means being arranged to be driven by exhaust gases from said gas generator and having at least two rotor stages of which at least one is a radial flow rotor stage, and a fan duct which is radially outwardly of, and coaxial with, said main flow duct, a fan located in said fan duct, said fan having at least one centrifugal flow rotor stage which is drivingly connected to said at least one radial flow rotor stage, at least one other rotor stage of said turbine means being drivingly connected to a member which is disposed externally of the power plant.

2. Power plant as claimed in claim 1 wherein the said gas generator is mounted in a housing, there being bearing means mounted on said housing, the said fan being journalled in the said bearing means.

3. Power plant as claimed in claim 1 wherein said member is a rotor of a rotary wing aircraft.

4. A rotary wing aircraft provided with at least one gas turbine power plant as claimed in claim 3, wherein the said rotor has rotor blades which are cylindrical and which are provided with slots.

5. An aircraft as claimed in claim 4 wherein drive to said rotor is provided from said at least one other turbine roter stage via an epicyclic gearbox.

6. An aircraft as claimed in claim 5 wherein the gearbox is located downstream of the gas generator and its output shaft is substantially coaxial with the axis of the gas generator.

7. Power plant as claimed in claim 1 wherein the rotor stages are alternately mounted from opposite sides of the main flow duct.

8. Power plant as claimed in claim 4 wherein alternate rotor stages of the turbine means are arranged to contra-rotate in operation.

9. Power plant as claimed in claim 1 wherein the turbine means is statorless.

10. Power plant as claimed in claim 1 wherein the fan includes an axial flow rotor stage upstream of the said at least one centrifugal flow rotor stage.

11. Power plant as claimed in claim 1 in which the fan has two said centrifugal flow rotor stages, the fan duct having a portion which extends radially inwardly from the first to the second of the centrifugal flow rotor stages.

12. Power plant as claimed in claim 1 wherein the gas turbine gas generator and the fan have a common air intake.

13. A rotary wing aircraft having hollow apertured rotary wings, a gas turbine power plant comprising a main flow duct, a gas turbine gas generator and a multi-stage radial flow free turbine means located in flow series in said main flow duct and being arranged to be driven by exhaust gases from said gas generator, a fan duct, a multi-stage fan in said fan duct drivingly connected to said free turbine means, at least one rotor stage of said fan being a centrifugal stage, and duct means for directing the fan exhaust into said hollow apertured rotary wings.

References Cited

UNITED STATES PATENTS

| | | |
|---|---|---|
| 2,115,112 | 4/1938 | Lysholm. |
| 2,526,409 | 10/1950 | Price _ _ _ _ _ _ _ _ _ _ _ _ 60—266 XR |
| 2,818,223 | 12/1957 | Dublhoff _ _ _ _ _ _ _ _ 60—226 XR |
| 2,831,543 | 4/1958 | Matthews _ _ _ _ _ _ 60—39.16 XR |
| 2,922,278 | 1/1960 | Szydlowski. |
| 2,991,618 | 7/1961 | Marscher et al. _ _ 60—39.16 XR |

MARK NEWMAN, Primary Examiner

A. D. HERRMANN, Assistant Examiner

U.S. Cl. X.R.

60—39.16, 39.18; 170—135.4; 244—6, 17.11; 253—16.5